Dec. 12, 1967 P. H. SCHULTE 3,358,276

COMBINATION RECORD-PLAYBACK AND ERASE MAGNETIC HEAD

Filed Nov. 1, 1963

INVENTOR
PAUL H. SCHULTE

BY Fisher, Christen, Sabol & Caldwell
ATTORNEYS

United States Patent Office 3,358,276

Patented Dec. 12, 1967

3,358,276

COMBINATION RECORD-PLAYBACK AND ERASE MAGNETIC HEAD

Paul H. Schulte, D-9 Gardenia, San Francisco Urb., Rio Piedras, Puerto Rico

Filed Nov. 1, 1963, Ser. No. 320,887
2 Claims. (Cl. 340—174.1)

ABSTRACT OF THE DISCLOSURE

The invention resides in the combination of two or more heads with their gaps in precise alignment by virtue of the assembly of the heads from two stamped semi-housings or die halves formed with the full build-in accuracy of the dies. The pole pieces of the record heads are lanced or cut from the housings but remain in attachment with the housings until the final lapping operations on the face of the head following the filling of the assembly housings with epoxy or suitable resins to fashion the components into position. In the record heads, the slots or housings from which the pole pieces are lanced comprise double window slots spaced apart and each having neck openings extending toward or to the arcuate face in the erase heads having shouldered bosses with neck extensions which fit precisely within the neck of the slots of the record head, the shoulders of the bosses fitting against the edges of the windows, thereby aligning the gaps of the heads precisely.

The present invention relates to the art of recording and reproducing from a magnetic tape and more particularly to transducer apparatus for performing these functions, along with that of erase.

The invention is particularly directed to the mechanical alinement of separately produced record-playback and erase heads in precise tracking relation which will cope with the exacting tolerances demanded for recording or reproducing from the relatively narrow modern day tapes.

The invention provides record-playback heads (hereinafter referred to as record heads) and erase heads for association in combinations of e.g., record-erase, record-erase-record, or erase-record-erase.

The tracking tolerances are even more critical in the use of multiple heads for multiple tracks wherein the gaps of each head must be accurately alined together in a manner to "track" or follow parallel tape tracks.

It is therefore a principal object of the present invention to provide magnetic transducers in unique housings which relate the respective gaps to indexing structure to permit a combination of separate heads indexed together in a manner to aline their gaps precisely relative to the tracks on the tape to be employed therewith.

Essentialy the gap forming structure of each type head is fixedly related to external integrally incorporated indexing structure which in turn mates with external indexing structure of adjacent units, the tolerance limits attained being within the order of, by way of example, one or two thousandths of an inch. By employing male bosses and female wells or receses, the heads are adapted for ready mounting by snap-in to relate the gaps of one head to another in operational alinement.

The fabrication of the heads is accomplished in a manner to take full advantage of accuracy or close tolerances inherent in punch and die techniques. Thus, the externally disposed indexing structure is formed along with the gap defining structure in each head with generally the same type techniques imparting accuracy to the external connectable indexing structure for the separate heads.

One common feature permitting this type fabrication resides in the fact that the outer shells or housings of each type head is of a high permeability magnetic material which serves as a casing and also as a magnetic shield for the inner components. A portion of this shielding material is lanced and/or embossed to outline the gap defining structure in alinement therewith such that the finished product incorporates the accuracies enabled by virtue of the overall structure being integrally formed from blanks.

While the gaps of the separate heads are alined laterally (for individual tape tracks) it is also possible to aline the heads for height, as desired. For example, the bosses of one head may abut against shoulders of the recesses of adjacent head(s). By radiusing an erase head off center and disposing it just below the upper level of an associated record head, the tape may be caused to "wrap" around the heads in a manner improving tape pickup without resort to pressure pad arrangements.

Therefore, with the foregoing in mind, it is among the objects of the invention to provide separately produced magnetic heads of the erase and record type readily and accurately indexable together, in various combinations.

It is a further object of the invention to provide such heads susceptible to indexing structure formation along with outer shell formation, essentially from common blanks such that integral parts become the gap forming and indexing structure in precise alinement.

It is a still further object of the invention to provide complementary heads which mate together to form a unitary structure capable of tape wrap of a type which may eliminate the requirement for pressure pads and other tape biasing mechanisms.

The foregoing will become even more apparent to those skilled in the art when read in conjunction with the acompanying drawing, wherein.

Figure 1:
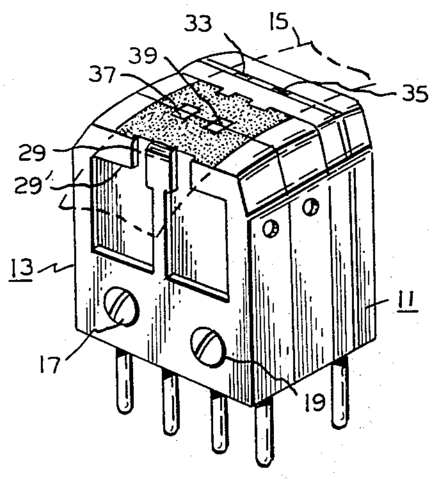
FIG. 1 is a view in perspective of an erase head in combination with a record head, operatively associated with a magnetic tape, generally shown in dashed outline.

In FIG. 1, the combination of a single erase head 11 and a record head 13 (capable of both record and playback functions) is shown in operative assembly relative to a magnetic tape 15, adapted to pass over the pole piece faces of the two heads.

Figure 2:
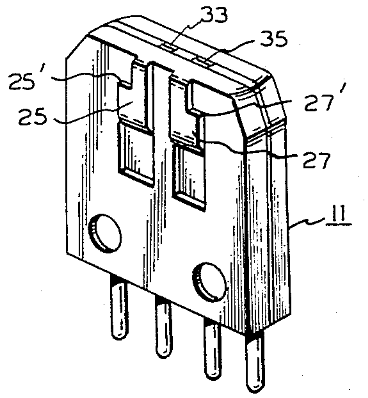
FIG. 2 is a view in perspective of the erase head of FIG. 1, per se.
Figure 3:
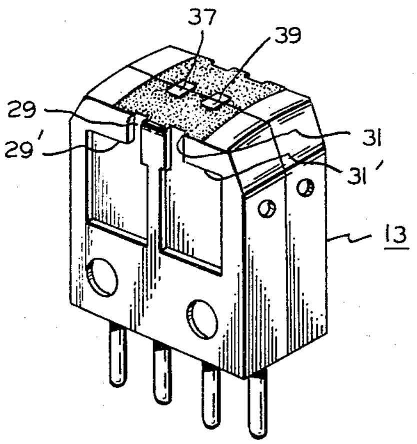
FIG. 3 is a view in perspective of the record head, per se.

The heads are held together by the screws 17 and 19, along with the nuts 21 and 23; however, the actual indexing is not provided through these mounting screws which, as a matter of fact, fit loosely within the mounting holes in order that the indexing structure, particularly depicted in FIGS. 2 and 3 may interlock the two heads in alined operative configuration.

Preferably, each type head is symmetrical, each having identical external surface configurations to permit the units to be alternated in various combinations. The interlocking structure may be seen as the bosses 25 and 27 of the erase head 11 of FIG. 2, adapted to fit the slotted recesses or wells 29 and 31 of the record head 13 of FIG. 3. As a matter of fact, the shoulders 25' and 27' of erase head 11 may abut the shoulders 29' and 31' of record head 13 to index as to head height along with the upper or neck portions providing the parallel gap alinement.

The latter is afforded through the fabrication of the erase head gaps 33 and 35 in precise alinement with the bosses 25 and 27, as well as the record gaps 37, 39 in precise alinement with the indexing slotted recesses 29 and 31.

The exact technique for fabricating such an erase head is set forth in my co-pending application Ser. No. 320,751 entitled "Erase Head" and filed concurrently herewith. Similary, such a record head is described in detail in my co-pending application Ser. No. 320,753 entitled "Magnetic Head" and filed concurrently herewith.

For purposes of the present invention it will suffice to know that the indexing structure of the individual heads is precisely and accurately indexed to the respective gaps of the heads and that such external indexing structure is compatible for precise orientation of the gaps of one head to the gaps of the next head.

Figure 4:
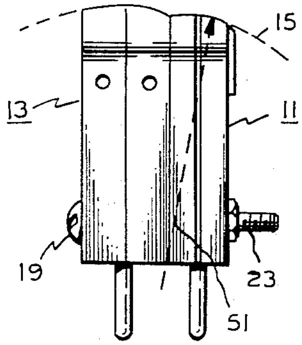
FIG. 4 is a view in side elevation of the combined heads of FIG. 1.

A further significant feature of the invention resides in the elimination of the requirement of pressure pads. The present invention enables this advantage through the precise indexing afforded by the structure heretofore described, along with off-center radiusing of the erase head 11, as is best seen in FIG. 4. By finishing off the operative face of the head 13, the tape will wrap about the faces under its own tensioning without the requirement of external pressure pads and the like. It has been found that an offset of a few thousandths of an inch (of the center of the radius from the center of the head 51) as depicted by the dotted line (FIG. 4) is sufficient to provide suitable wrap.

Figure 5:
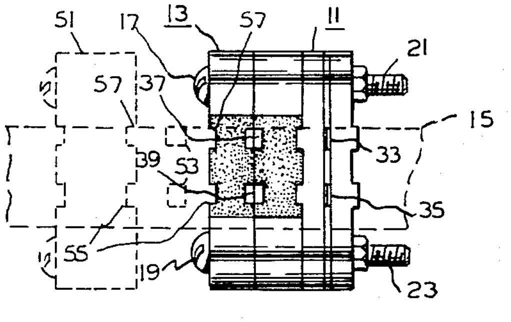
FIG. 5 is a view in plan of the combined heads of FIG. 1, with superimposed tape outline.

Both FIGS. 1 and 5 show the tape 15 operatively associated with the joint heads 11 and 13. It should be pointed out that the tape in actual use is always staggered relative to the center line of the heads, in position to play two separated tracks, such as those forming associated quarter track or four track stereo recordings.

Obviously, the heads are sufficiently wide to accommodate the tape in its other extreme position (not shown) to play the remaining two associated tracks of the tape 15.

However, of course, the principles herein taught are equally applicable to single track monaural tape handling.

Also, in FIG. 5 there is shown, in dotted outline, a further record head 51 adapted to be coupled to the record head 13 and erase head 11 combination adjacent to the record head. This is achieved by using a pair of keys 53 adapted to fit the channels or keyways formed by opposing slots 55 and 57 of the record heads. The use of suitable keys 53 enables precise alinement of the gaps of head 51 to the gaps of heads 11 and 13.

Other modifications and alternatives will occur to those skilled in the art from a reading thereof and, accordingly, it is intended that the invention be limited only by the appended claims, wherein,

What is claimed is:

1. A combination erase and record-playback magnetic head comprising an erase head having side by side external bosses in precise alinement with each gap thereof; a record-playback head having slotted recesses in side by side relation at least partially conforming in configuration precisely to said bosses; said bosses including shoulders and said recesses including edges for abutment therewith to position the erase head with its face slightly below that of the record-playback head; the face of the erase head being finished off arcuately along a radius offset from the center line of the erase head by a few thousandths of an inch to permit tape to wrap about the operative faces of the heads comprising said combination head; and means for securing the heads together with the bosses mated in the recesses.

2. An erase and record-playback magnetic head for association with their operative faces adjacent each other comprising in combination an erase head having side by side external bosses extendng toward its face in precise alinement with each gap thereof; a record-playback head having slotted recesses in side by side relation in precise alinement with each gap and oriented in the direction of its face; said recesses having configurations to receive and precisely locate said bosses and means for securing the heads together with the bosses mated in the recesses; the face of the erase head being finished off arcuately along a radius offset from the center line of the erase head by a few thousandths of an inch to permit tape to wrap about the operative faces of the heads comprising said combination head.

References Cited

UNITED STATES PATENTS

| | | | |
|---|---|---|---|
| 3,274,347 | 9/1966 | Page | 179—100.2 |
| 2,880,280 | 3/1959 | Gernert et al. | 179—100.2 |
| 3,222,461 | 12/1965 | Wood et al. | 179—100.2 |

BERNARD KONICK, *Primary Examiner.*

A. I. NEUSTADT, *Assistant Examiner.*